United States Patent [19]

Jones

[11] Patent Number: 4,589,475
[45] Date of Patent: May 20, 1986

[54] HEAT RECOVERY SYSTEM EMPLOYING A TEMPERATURE CONTROLLED VARIABLE SPEED FAN

[75] Inventor: William T. Jones, East Grand Rapids, Mich.

[73] Assignee: Plant Specialties Company, Grand Rapids, Mich.

[21] Appl. No.: 490,531

[22] Filed: May 2, 1983

[51] Int. Cl.⁴ ............................................ G05D 23/20
[52] U.S. Cl. ...................................... 165/35; 165/39; 165/40
[58] Field of Search ....................... 165/40, 36, 35, 28, 165/39, 22

[56] References Cited

U.S. PATENT DOCUMENTS

| | | | |
|---|---|---|---|
| 2,826,395 | 3/1958 | Petty | 165/39 |
| 3,288,205 | 11/1966 | Egbert | 165/40 X |
| 3,500,655 | 3/1970 | Lyons | 62/183 |
| 3,827,343 | 8/1974 | Darm | 165/166 |
| 3,926,249 | 12/1975 | Glancy | 165/39 |
| 3,990,505 | 11/1976 | Davenport | 165/43 |
| 4,009,825 | 3/1977 | Coon | 165/22 X |
| 4,018,266 | 4/1977 | Kay | 165/12 |
| 4,037,783 | 7/1977 | Bradford | 165/16 |
| 4,090,663 | 5/1978 | Boone et al. | 165/40 X |
| 4,138,062 | 2/1979 | Graden | 165/DIG. 2 |
| 4,142,575 | 3/1979 | Glancy | 165/29 |
| 4,149,590 | 4/1979 | Ospelt | 165/53 |
| 4,210,278 | 7/1980 | Obler | 165/16 |
| 4,216,903 | 8/1980 | Giuffre | 165/DIG. 12 X |
| 4,240,499 | 12/1980 | Kals | 165/DIG. 12 X |
| 4,243,871 | 1/1981 | McKenney | 165/35 X |

OTHER PUBLICATIONS

Carrier Corporation bulletin entitled Modular Central Station Air Handling Units, form 39E-5P, 1977.
Carrier Corporation bulletin entitled Modudrive Controlled Speed Fan Drive, form 39E-7P, 1980.
Trane Air Conditioning bulletin entitled Centrifugal Fan Air-Cooled Condensers, DS ACDS-2/Apr. 80.

Primary Examiner—Sheldon J. Richter
Assistant Examiner—Randolph A. Smith
Attorney, Agent, or Firm—Price, Heneveld, Huizenga & Cooper

[57] ABSTRACT

An energy recovery system includes a source of fluid desired to be cooled which is passed through a heat exchanger which receives input air and passes it through the heat exchanger utilizing a temperature controlled variable volume fan controlled to assure the discharge temperature from the heat exchanger is maintained at a predetermined temperature or within a predetermined temperature range.

8 Claims, 3 Drawing Figures

HEAT RECOVERY SYSTEM EMPLOYING A TEMPERATURE CONTROLLED VARIABLE SPEED FAN

BACKGROUND OF THE INVENTION

The present invention relates to an energy recovery system and particularly one in which the heat from a heated liquid from a process is recovered by a temperature controlled heat exchanger.

With the ever-increasing cost of energy in recent years, it is desired to recover heat normally generated by manufacturing processes and which previously had been lost by cooling through external cooling towers or the like. There exists a variety of systems, as represented for example, by U.S. Pat. Nos. 3,500,655; 3,827,343; 3,926,249 and 4,142,575 which disclose heat recovery systems for commercial application in which either manually or temperature actuated dampers are employed to control air flow in mixing chambers or heat exchangers to add recovered heat to a building when heat is required or discharge it from the building when no heat recovery is desired.

Such systems, although providing heat recovery under certain conditions, are inefficient in that large volumes of air are moved constantly without regard to the temperature conditions of the system, and simple mixing or rerouting of the air flow is employed to provide the discharge of recovered heat into a building or external to the building as conditions require. Such systems are inherently inefficient due to the utilization of the electrical energy required to drive the blower systems employed.

SUMMARY OF THE PRESENT INVENTION

The system of the present invention overcomes the deficiencies of the prior art heat recovery systems by providing an energy recovery system in which a source of fluid desired to be cooled is passed through a heat exchanger which receives input air from either a building or externally as ambient temperature conditions require and passes it through a heat exchanger utilizing a temperature controlled variable air volume controller to assure the discharge temperature from the heat exchanger is maintained at a predetermined temperature or within a predetermined temperature range. The volume of air moved through the heat exchanger is varied as conditions require to assure that during heat recovery, the air volume is efficiently controlled to maintain a substantially constant temperature of air supplied to the facility.

These and other features, advantages and objects of the present invention will become apparent upon reading the following description thereof together with reference to the drawing figures in which:

DETAILED DESCRIPTION OF THE PREFERRED EMBODIMENT

Figure 1:
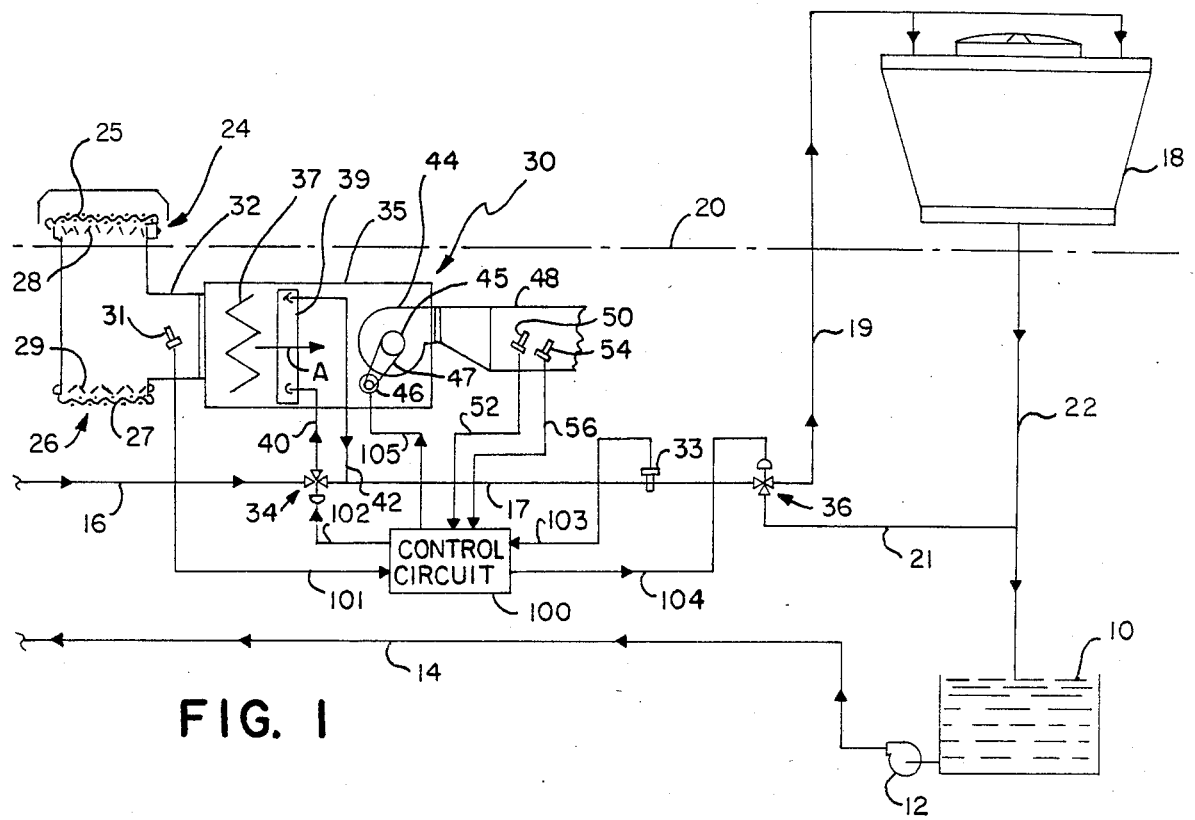
FIG. 1 is a schematic mechanical and electrical diagram of one embodiment of the present invention.

Referring initially to FIG. 1, there is shown a heat recovery system used in connection with a liquid cooling circuit for cooling, for example, motors employed in operating heavy machinery, DC rectifiers employed in plating installations or compressors employed in high volume manufacturing processes. The liquid cooling system for the manufacturing process includes a reservoir 10 of cooling fluid which is circulated by a means of a pump 12 through an outlet conduit 14 for pumping cooled liquid, such as water, to the manufacturing area. There, it is circulated through the heat exchangers associated with the equipment to be cooled, heated thereby and returned through conduit 16. Typically, the temperature of liquid in conduit 14, in most installations, is in the neighborhood of 85 degrees F., and the system is designed with the flow rate of liquid selected such that the temperature of heated liquid returned by conduit 16 is in the neighborhood of 95 degrees F. These temperatures may vary, and a temperature differential of about 5 degrees F. to 30 degrees F. is the normal operating range of the system. Without the heat recovery system of the present invention, the heated fluid in conduit 16 would be applied directly to a cooling tower 18 mounted on the roof 20 of the facility and returned to reservoir 10 through return conduit 22.

In order to recapture the heat contained in the liquid, which typically is water, a heat recovery system embodying the present invention and shown generally at 30 in FIG. 1 is employed. The heat recovery system 30 receives air from an outside air inlet 24. Air can also be supplied from the building through air inlet 26. Naturally, during summer months, the heat recovery system 30 is not employed and is bypassed, as described in detail below.

Inlets 24 and 26 each include air screens 25 and 27, respectively, and commercially available, electrically operated dampers 28 and 29. These dampers are commercially available temperature controlled units with damper 28 normally opened to permit outside air to be supplied to an inlet duct 32 of the heat recovery system 30. Damper 29 can be opened and damper 28 closed during summer months to exhaust air from the building, if desired. Dampers 28 and 29 can be of the type manufactured by TSD Corporation such as Model No. 400UD thereof and other than providing alternate or mixed air input sources to the heat recovery system 30 form no part of the present invention. The control of the dampers either manually or in response to temperature sensors associated therewith is entirely conventional.

The inlet air temperature in duct 32, regardless of its source, is sensed by a first temperature sensor 31 having its output coupled to the input 101 of a control circuit 100 which, if the inlet temperature is above about 60 degrees F., provides an output control signal on electrical conductor 102 to a three-way, electrically or pneumatically actuated valve 34 such that heated liquid in conduit 16 is fed directly to a bypass conduit 17 to bypass the heat recovery system 30. A second temperature sensor 33 placed in liquid conduit 17 senses the temperature of the heated fluid from the manufacturing process and has its output coupled to an input terminal 103 of control circuit 100. If sensor 33 senses a liquid temperature greater than about 85 degrees F., control circuit 100 provides an output control signal at output conductor 104 to a second three-way, electrically or pneumatically actuated valve 36 to apply the heated fluid to a conduit 19, feeding it to the cooling tower 18. If the sensed temperature is less than or equal to 85 degrees F., the liquid is returned directly to reservoir 10 through innerconnecting conduit 21. Sensors 31 and 33 thereby assure that in the event the inlet air temperature is high, and therefore, heat recovery is not desired, the heat recovery system 30 is bypassed and with or without the operation of the heat recovery system, if additional cooling of the heated fluid in conduits 16 and 17 is required, the fluid is applied to cooling tower 18. This operation of system 30 and use of tower 18 concurrently typically occurs only in temperature, ambient conditions where some heat recovery is desired but not the full capacity of the system.

Inlet duct 32 of the heat recovery system 30 is coupled to the inlet of an enclosure 35 which can be a commercially available module made by the Carrier Corporation such as a Model 39E system modified to operate in accordance with the present invention. This commercially available unit is described in detail in a 1977 Carrier Corporation bulletin Form 39E-5P, the disclosure of which is incorporated herein by reference. The module includes an input filter 37, a liquid-to-air heat exchanger 39 which is positioned downstream in the air flow direction indicated by arrow A in FIG. 1 and which includes a hot liquid input line 40 and a discharge line 42 for liquid cooled in exchanger 39. Downstream of the heat exchanger 39 is a blower 44 which includes a variable speed drive motor system 46 coupled to a drive pulley 45 of the blower through an innerconnecting drive link 47. An outlet duct 48 defining discharge means is coupled to the discharge end of module 35 and leads to the building to which the heat is supplied either directly as a heat discharge register in a large open manufacturing area, or duct 48 can also be coupled to a two-way air directing damper to discharge air from the facility through a roof vent in summer months. In such case, the inlet damper 29 is opened and damper 28 closed, and the system operates as a vent. The heat recovery exchanger 39 can be used to supplement the cooling of the liquid by tower 18 in this mode of operation if the air inlet temperature is less than 85 degrees F.

Positioned in the discharge duct 48, adjacent heat recovery system 30, is a first temperature sensor 50 which has its output coupled to control circuit 100 through electrical conductor 52. The electrical signal from sensor 50 is employed by the control circuit 100 to develop an output control signal on output conductors 105 to control the air flow through unit 30 by varying the speed of operation of blower 44 through the speed of rotation of drive shaft 45, as described below. A separate temperature sensor 54 is also placed in duct 48 and is coupled to control circuit 100 through conductor 56 and is employed to deactivate motor 46 in the event the temperature sensed in the discharge conduit 48 falls below about 80 degrees F. which is the adjustable minimum desired air discharge temperature.

OPERATION

Figure 3:
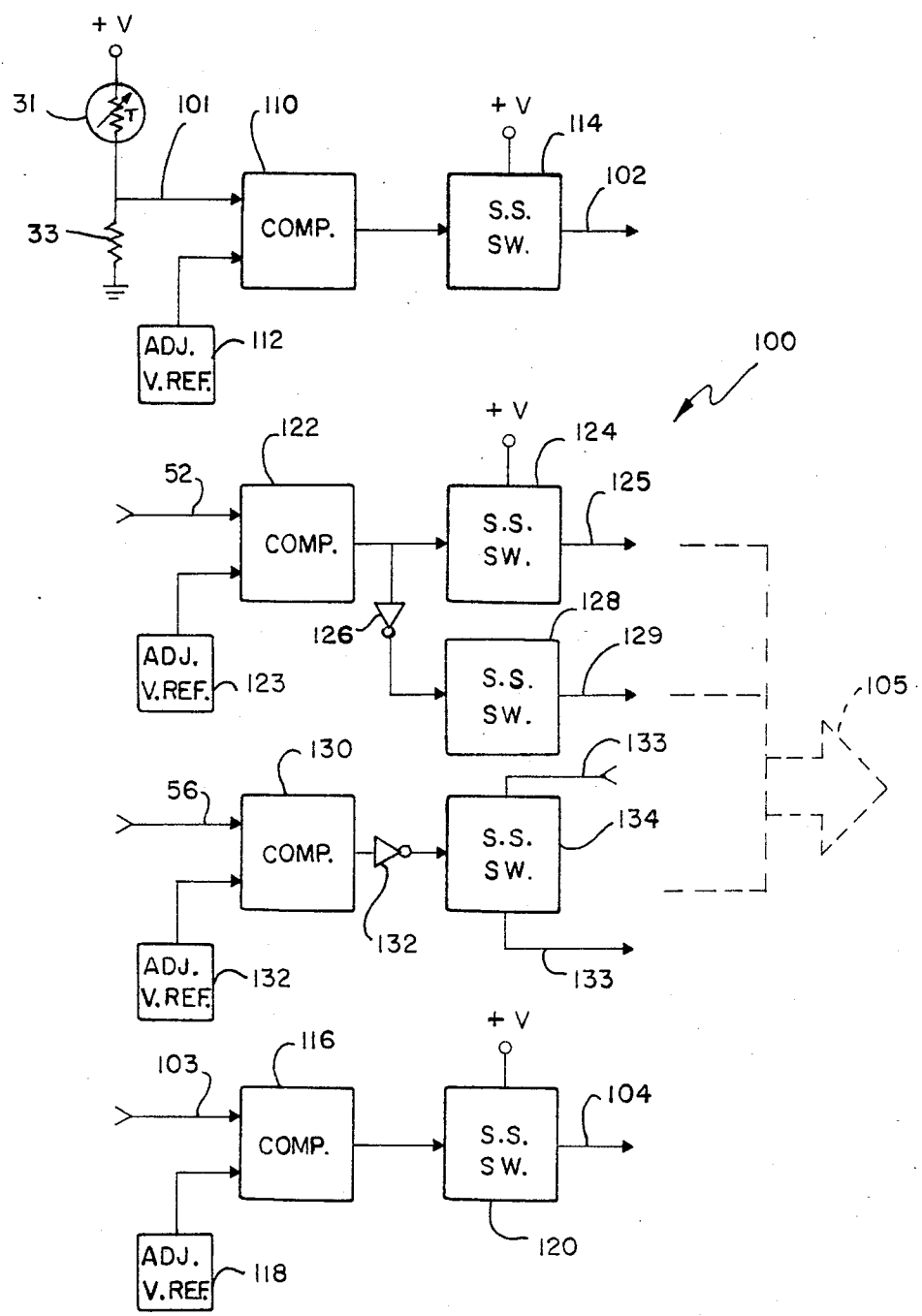
FIG. 3 is an electrical circuit diagram in block form of the control circuit shown in FIG. 1.

The control of the heat recovery system 30 is now described in conjunction with the block electrical circuit diagram of FIG. 3. Temperature sensor 31 can be any number of commercially available sensors providing an electrical analog or digital output signal representative of the sensed input temperature. In FIG. 3, the sensor is a thermistor coupled to a voltage source +V and in series to a voltage dividing resistor 33. The junction of thermistor 31 and resistor 33 is coupled to one input of a comparator circuit 110 while the reference input terminal of comparator 110 is coupled to an adjustable reference voltage source 112 which, in the preferred embodiment of the invention, is set to provide a voltage corresponding to a 60 degrees F. temperature representative signal from sensor 31. If the temperature is below 60 degrees F., the comparator provides a logic "1" output signal while if the sensed inlet air temperature is above 60 degrees F., the comparator outputs a logic "0" signal to the control input terminal of a solid state switch 114 which can be an SCR or other similar device coupled between a source of operating power +V in the Figure to actuate valve 34 (FIG. 1) through the application of the +V power supply to this three-way valve. The valve is actuated to bypass conduit 40 and couple the fluid from conduit 16 directly to conduit 17 in the event the input temperature is more than 60 degrees F.

A similar circuit is employed for controlling the operation of valve 36 to either return the fluid directly to reservoir 10 through return conduit 21 or through the cooling tower via conduit 19, depending on the temperature sensed by temperature sensor 33. Sensor 33 has an output terminal providing an electrical signal representative of the sensed temperature which is coupled by conductor 103 to one input of a comparator 116 having a reference voltage input terminal coupled to a variable reference voltage source 118 selected to provide an output voltage representative of the voltage sensed by sensor 33 at 85 degrees F. The output of comparator 116 is also coupled to the control input terminal of solid state switch 120 for applying a +V supply source to the control terminal of valve 36 via conductor 104. Thus, when the temperature sensed by sensor 33 is above 85 degrees F., comparator 116 provides a logic "1" output signal actuating solid state switch 120 to, in turn, actuate the valve 36 for bypassing fluid through the cooling tower. Having described the liquid flow controlling circuitry, a description of the fan speed control in connection with the heat recovery system is now described.

The temperature sensor 50 for the discharge means of the heat recovery system has an output terminal 52 coupled to one input of a comparator circuit 122 having a reference input terminal coupled to an adjustable voltage reference source 123. Source 123 is adjusted to provide a reference voltage corresponding to a sensed temperature of 90 degrees F. The output of comparator 122 will be a logic "1" or a logic "0" when the sensed temperature is above or below the desired 90 degrees F. temperature, respectively. The output signal from comparator 122 is applied directly to a first solid state switch 124, coupled to +V and having an output terminal 125 which is one of the conductors 105, shown in FIG. 1. The output of comparator 122 is also coupled to a logic inverting circuit 126 which is applied to a second solid state switch 128 also coupled to +V for providing an output signal on conductor 129. With this circuit arrangement, if the temperature sensed by temperature sensor 50 is above 90 degrees F., output 125 will be at a logic "1" while output terminal 129 will be at a logic "0". Similarly, when the temperature of the discharge air falls below 90 F., the output of terminal 125 will switch to a logic "0" level while output terminal 129 will switch to a logic "1". Thus, the control circuit provides a pair of output signals of opposite polarity which is employed by a dual input motor controlling fan speed control circuit which is commercially available from the Carrier Corporation and identified as a Modudrive Control System and described in a 1980 bulletin entitled Form 39E-7P, the disclosure of which is incorporated herein by reference. The control circuit 100, including comparators 122 and solid state switches 124 and 128 are employed to control the fan speed through speed increase and decrease switches contained within the Modudrive Control System which actuates a variable speed pulley for increasing or decreasing the fan speed as a function of sensed temperature. In this system, the fan motor runs at a substantially constant speed while the drive pulley coupled between the motor output shaft and the drive link 47, shown in FIG. 1, is adjusted to increase or decrease the fan speed on demand. Naturally, a lower fan speed is necessary when the input air to the system is cooler and less energy is employed by the motor to provide the lower fan speed, saving energy for the system. Other variable volume fan controls can be utilized in which the electrical controlling signal developed by the sensing means 50 could take the form of conventional, variable air volume controls.

Circuit 100 also includes an override control which will assure the heat recovery system shuts down in the event the discharge air temperature should, for any reason, fall below about 80 degrees F. or the temperature sensed by sensor 33 is about 70 degrees F. when the fan is running at the minimum speed. Thus, sensor 54 has its electrical output 56 coupled to the input of comparator circuit 130 having a reference input terminal coupled to an adjustable voltage reference source 132 adjusted to provide a logic "0" output signal in the event the temperature falls below 80 degrees F. which logic signal is inverted by an inverter circuit 132 to provide a logic "1" output signal when the temperature falls below 80 degrees F. This signal is applied to the control input terminal of a solid state switch 134 coupled in series with the fan motor 46 voltage source which includes a conductor 133. Thus, in the event the output temperature falls below 80 degrees F., the motor 46 will be deactivated in conditions where the fan speed is at its minimum possible speed, and the 90 degrees F. output temperature cannot be maintained but has fallen to an undesirable level, such as 80 degrees F.

The adjustable reference voltage sources and comparators are conventional, commercially available electrical circuits as are the solid state switches and inverters, represented in block form in FIG. 3. Either analog or digital signal processing circuits for these two different formats can be employed in the control circuit of the heat recovery system of this invention.

Figure 2:
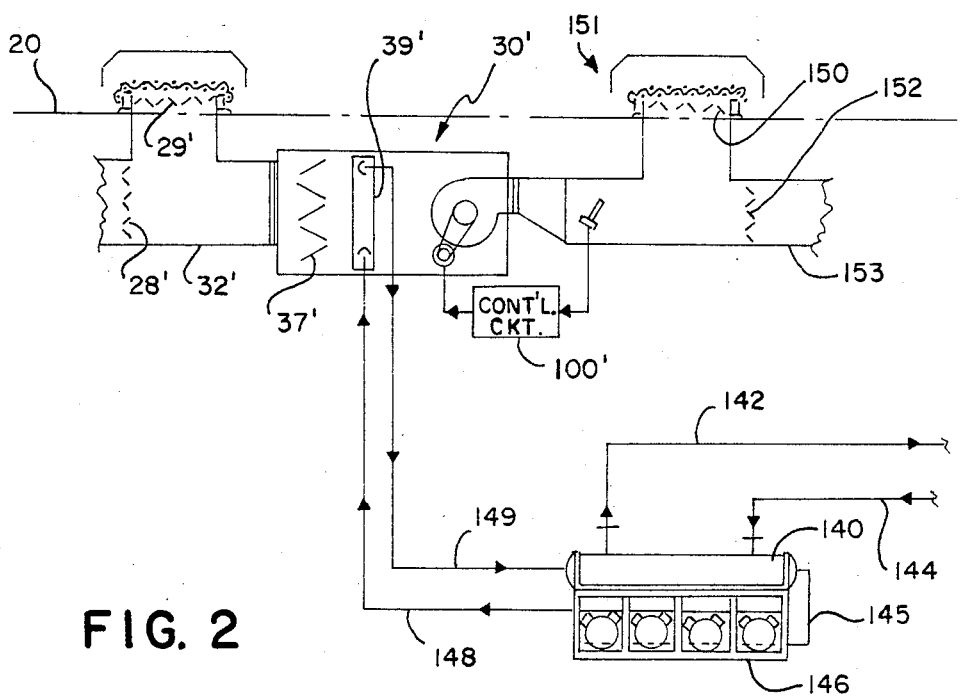
FIG. 2 is a schematic mechanical and electrical diagram of a second embodiment of the present invention.

The heat recovery system also can be used in connection with compressor-evaporator installations used in large cooling rooms or freezers for food storage or in providing liquid coolant for chilling injection molding apparatus for example. In such installations, an evaporator 140, shown in FIG. 2, provides a heat exchanger for providing, as shown schematically in FIG. 2, a cooled output flow of fluid indicated by line 142, and receives circulated, warmed fluid, as indicated by line 144. The evaporator is used in connection with a series of compressors 146 which receive low pressure Freon from evaporator 140 by means of interconnecting conduit 145 and provides high pressure, high temperature Freon gas in conduit 148. Conduit 148 can be coupled to a heat recovery system 30' substantially identical to that described in connection with FIG. 1 but which includes a high pressure heat exchanger 39' which receives the heated high pressure Freon gas and returns from the exchanger 39' liquified Freon at a reduced temperature via conduit 149. The liquified Freon is then passed through evaporator 140 to provide the cooling of processed fluid, such as a glycol based liquid, for the cold storage facility. The heat recovery system 30', shown in FIG. 2, is substantially identical to that shown in FIG. 1 with a similar control circuit 100' for controlling the fan speed of the system to provide an output air temperature of approximately 90 degrees F. which can, depending on the position of electrically actuated dampers 150 and 152, associated with an outside air discharge vent 151 or a heat supply duct 153, respectively, provide recovered heat to the building for use in supplementing the installation's heating supply or in summer months, discharge the heat developed by compressors 146 through a roof vent 151.

The heat recovery system of the present invention for providing a substantially constant heated air output for supplementing heat supplied to a facility can be employed in connection with a large variety of industrial processes which generate heat energy which typically has been wasted. By controlling the air flow volume in a heat recovering heat exchanger, in response to a sensed temperature, for maintaining an output temperature at a substantially constant level, the heat is recovered in an efficient manner, and the controlled value of discharged air can be efficiently utilized in a facility. The temperature levels of the preferred embodiment of the present invention, as disclosed herein naturally can be adjusted for particular installations, if desired, with a range of from about 85 degrees F. to 95 degrees F. being preferred.

In the heat recovery system of the present invention, about 300 gallons per minute of fluid at a temperature differential of about 10 degrees F. is thus employed as the heat source. For use in an area where the outside ambient air temperature is less than or equal to 59 degrees F. for 5,950 hours per year (for example, Muskegon, Mich., the gross energy recovered is about 88,950 therms per year. At an average cost of $0.42 per therm, this represents a gross utility cost savings of about $37,359 per year when the cost of operation of the unit is not considered.

Calculations of the energy saved by the system of FIG. 1 compared to a standard design heat recovery system in which a constant fan speed is employed indicates the electrical energy used by the fan motor in the present invention is less than one-third of that of the prior art. Even when the heat generated by the fan motor is recovered by placing the motor in the air flow path, the net cost of operating the system of the present invention is also less than one-third that of the prior art. The cost of operation of the system shown in FIG. 2 is substantially one-half that of the prior art. Thus, with the cost of operation of the system of the present invention significantly less and the heat recovery the same, the overall energy efficiency of the present invention represents a signficiant improvement over existing systems.

Various modifications to the preferred embodiment of the invention described herein can be made by those skilled in the art without departing from the spirit or scope of the invention as defined by the appended claims.

The embodiments of the invention in which an exclusive property or privilege is claimed are defined as follows:

1. A heat recovery system for use in recovering heat from an industrial process producing a heated fluid comprising:
   a source of inlet air;
   a housing coupled to said source and including a heat exchanger;
   means for passing said heated fluid through said heat exchanger;
   said housing including means for moving a variable volume of air adjustable over a continuous range from said source through said heat exchanger;
   air discharge means communicating with said housing for discharging air which has passed through said heat exchanger;
   a control system including first temperature sensing means for sensing the discharge temperature of the discharge air moving through said discharge means and a control circuit coupled to said first temperature sensing means and to said moving means for varying the volume of air moved in response to the sensed discharge temperature to control the temperature of discharge air passing through said discharge means at a first predetermined value; and
   said control system including second temperature sensing means for sensing the temperature of said source of inlet air and valve means coupled to and controlled by said control circuit to cause liquid to bypass said heat exchanger when the inlet air temperature rises above a second predetermined value.

2. The apparatus as defined in claim 1 wherein said moving means comprises variable volume fan means.

3. The apparatus as defined in claim 2 wherein said circuit provides a control output signal to vary the volume of said fan means for maintaining the temperature of air flowing through said discharge means within a predetermined range.

4. A heat recovery system for use in recovering heat from an industrial process producing a heated liquid comprising:
   a source of inlet air;
   a housing coupled to said source and including a liquid-to-air heat exchanger;
   means for passing said heated liquid through said heat exchanger;
   said housing including variable volume fan means for moving a volume of air which is adjustable over a continuous range from said source through said heat exchanger;
   air discharge means coupled to said housing for discharging air heated by said heat exchanger;
   a control system including first temperature sensing means for sensing the discharge temperature of the air in said discharge means and a control circuit coupled to said first temperature sensing means and to said fan means for varying the volume of said fan means in response to the sensed discharge temperature to maintain the temperature of discharge air passing through said discharge means at a first predetermined value; and
   said control system including second temperature sensing means for sensing the temperature of said source of inlet air and valve means coupled to and controlled by said control circuit to cause liquid to bypass said heat exchanger when the inlet air temperature rises above a second predetermined value.

5. The apparatus as defined in claim 4 wherein said circuit means responds to a sensed discharge air temperature below a third predetermined value to deactivate said fan means.

6. The apparatus as defined in claim 5 wherein said circuit provides a control output signal to vary the volume of said fan means for maintaining the temperature of air flowing through said discharge means at about 90 degrees F.

7. The apparatus as defined in claim 6 wherein said second predetermined value is about 60 degrees F.

8. The apparatus as defined in claim 7 wherein said third predetermined value is about 80 degrees F.

* * * * *